United States Patent [19]

Hörmann et al.

[11] Patent Number: 5,232,891
[45] Date of Patent: Aug. 3, 1993

[54] PROCESS FOR THE MANUFACTURE OF A GAUZE FOR A CATALYTIC CONVERTER AND A GAUZE FOR A CATALYTIC CONVERTER MANUFACTURED ACCORDING THERETO

[75] Inventors: Michael Hörmann, Mömbris; Stefan Kotowski, Seligenstadt; David F. Lupton, Gelnhausen; Werner Reiss, Hanau; Friedhold Schölz, Rodenbach; Bruno Streb, Freigericht; Antje Viel, Gelnhausen, all of Fed. Rep. of Germany

[73] Assignee: W. C. Heraeus GmbH, Hanau, Fed. Rep. of Germany

[21] Appl. No.: 749,296

[22] Filed: Aug. 23, 1991

[30] Foreign Application Priority Data

Sep. 12, 1990 [DE] Fed. Rep. of Germany ....... 4028916

[51] Int. Cl.⁵ .................. B01J 23/72; B01J 23/89; B01J 35/04
[52] U.S. Cl. .................. 502/326; 502/331; 502/527
[58] Field of Search ............ 502/326, 331, 527

[56] References Cited

U.S. PATENT DOCUMENTS

| | | | |
|---|---|---|---|
| 3,660,024 | 5/1972 | Gillespie et al. | 502/527 X |
| 3,931,051 | 1/1976 | Dubler | 502/326 X |
| 4,154,705 | 5/1979 | Baldi et al. | 252/466 PT |
| 4,443,557 | 4/1984 | Baldi | 502/301 |

FOREIGN PATENT DOCUMENTS

| | | |
|---|---|---|
| 0259966 | 3/1988 | European Pat. Off. |
| 0364153 | 4/1990 | European Pat. Off. |
| 2523476 | 4/1983 | France |

OTHER PUBLICATIONS

Ullmanns Encyklopädie der technischen Chemie (Ullmann's Encyclopedia of Technical Chemistry), vol. 20, 4th Edition 1981, p. 309.

Primary Examiner—W. J. Shine
Attorney, Agent, or Firm—Felfe & Lynch

[57] ABSTRACT

Catalytic gauzes which have an enlarged surface can be manufactured from a wire made of 90Pt/10Rh, for example, by coating the wire with a base metal, thermally treating the wire under partial conversion of the 90Pt/10Rh into solid solutions with the base metal, dissolving the base metal and weaving a wire gauze. They are used for the oxidation of ammonia and the ammoxidation of methane.

13 Claims, No Drawings

PROCESS FOR THE MANUFACTURE OF A GAUZE FOR A CATALYTIC CONVERTER AND A GAUZE FOR A CATALYTIC CONVERTER MANUFACTURED ACCORDING THERETO

The invention concerns a process for the manufacture of a woven wire gauze for a catalytic converter which comprises the noble metal alloys platinum/rhodium or platinum/rhodium/palladium and has an enlarged surface and a gauze manufactured in accordance therewith and its use.

The oxidation of ammonia to produce nitric acid involves the use of catalysts which are made of alloys of platinum and rhodium and, optionally, palladium, particularly 90Pt/10Rh and 90Pt/5Rh/5Pd. These catalysts have the form of woven gauzes, usually 1024 meshes per $cm^2$ and a wire thickness of 0.06 mm or 0.076 mm. {Ullmanns Encyklopädie der technischen Chemie [Ullmann's Encyclopedia of Technical Chemistry], Vol. 20, 4th edition 1981, 309). Catalysts of a similar kind are used for the ammoxidation of methane to form hydrocyanic acid.

EP-A1-259 966 discloses catalytic gauze elements for ammonia oxidation having platinum coatings with high surface areas exceeding 50 cm $^2$/g. In the presence of these catalytic gauzes, the ammonia oxidation is carried out at low temperatures, and the reaction can be ignited by means of a hydrogen flame already below 75 ° C. They are preferably produced by applying mixtures of thermally decomposable platinum compounds and volatile solvents onto the finished gauzes and by thermally decomposing the platinum compounds.

Based on this state-of-the-art, the object of the invention is to find a process for manufacturing a wire-woven catalytic gauze which comprises the noble metal alloys platinum/rhodium or platinum/rhodium/palladium with an enlarged surface which does not require the additional use of thermally decomposable platinum compounds or other platinum sources to obtain an enlarged surface.

The process by which the object is accomplished is characterized in accordance with the invention by coating the wire with a base metal, diffusion annealing of the coated wire forming a zone of noble metal/base metal solid solution, dissolving the base metal and weaving the so obtained wire.

In accordance with the invention, a process for the manufacture of a wire-woven gauze for a catalytic converter comprising the noble metal alloys platinum/rhodium or platinum/rhodium/palladium with an enlarged surface comprises coating the wire with base metal to form a base metal coating. The process includes diffusion annealing the coated wire forming a noble metal/base metal solid solution zone. The process also includes dissolving the base metal and weaving the so obtained wire.

For a better understanding of the invention, together with other and further objects thereof, reference is made to the following description and its scope will be pointed out in the appended claims.

The process has proven particularly effective when the thickness of the base metal coating ranges between 0.3 micrometer and 1 millimeter and when the diffusion annealing is carried out at a temperature between 750° C. and the melting point of the base metal, preferably in a continuous annealing oven and in an atmosphere of protective gas, such as nitrogen or argon.

The duration of the diffusion annealing depends upon the annealing temperature and the diffusion coefficient of the base metal and must preferably be selected such that 1-30% of the original wire diameter are converted into the noble metal/base metal solid solution zone, measured from the noble metal alloy/base metal interface. The process of the invention has proven particularly effective when approximately 3% of the original wire diameter are converted into the noble metal/base metal solid solution zone.

In order to increase the mechanical strength of the wire and the gauze woven therefrom, it has proven advantageous to draw the wire after the diffusion annealing, preferably by a third of its diameter. If this process step is to be implemented, the diamater of the wire which serves as a basis for the process of the invention should range between 0.1-0.5 millimeter. Otherwise, the diameter of the wire can range between 0.05-0.1 millimeter.

Any base metal able to form a solid solution with the noble metal—platinum, rhodium and, where present, palladium—can be used to coat the wire. Copper, nickel or mixtures of these two base metals, however, have proven particularly effective.

The wire can be coated with the base metal in accordance with any known metallizing process leading to a uniform coating of the wire with the base metal at the desired thickness, for example immersion, spraying, vapor deposition, cathode sputtering, flame spraying, cladding, electroplating or electroless-plating. Electroplating of the base metal coating has proven particularly advantageous for the process in accordance with the invention. The copper coatings can be deposited, for example, from cyanidic copper electrolytes, the nickel coatings from nickel sulfate/nickel chloride electrolytes.

The dissolution of the base metal after the diffusion annealing or after the drawing of the wire can be carried out electrolytically, for example. The process of the invention, however, preferably employs a treatment with an etching solution selected according to the base metal to be dissolved. This etching solution must not dissolve the noble metal—platinum, rhodium and, where present, palladium.

The gauze can be woven such that both warp and weft are made of the wire with the enlarged surface. It is, however, also possible to select conventional wire as warp or weft.

In the process of the invention, the surface is enlarged by means of a treatment of the wire itself such that, in contrast to the known process, no additional noble metal sources are required. Moreover, none of the process steps involves the risk of surface area reduction due to thermal effects, for example a sintering of the noble metal, since the etching as the actual step of surface formation is carried out far below the sintering temperature of the noble metal.

Another particular advantage of the process is that the operation steps leading to the enlarged surface can be integrated in conventional processes for manufacturing catalytic gauzes without major expenses on personnel and machinery.

The catalytic gauze manufactured in accordance with the process of the invention distinguishes itself by a surface which is uniformly enlarged by at least a factor 100 and has a coral-like structure. With respect to a 90Pt/10Rh-wire with a diameter of 60 micrometers and a gauze woven therefrom, a surface enlarged by the factor 100 correspondens, for example, to a specific surface of more than 3000 cm$^2$/g. The enlarged surface, in contrast to the high-surface platinum coating of known catalytic gauzes, has very good mechanical stability since it is an integral part of the wire and the gauze. An enlarged surface forming an integral part of the wire is to be understood in accordance with the invention as an enlarged surface produced from the material of wire which did not previously have an enlarged surface.

The gauze can be used for catalyzing the ammonia oxidation and the ammoxidation of methane.

The following example describes in greater detail the manufacture of a gauze for a catalytic converter in accordance with the process of the invention.

EXAMPLE

A clean wire made of 90Pt/10Rh with a diameter of 0.12 mm is passed through a cyanidic copper electrolyte {Heraeus cyanidic bright copper bath CU 786}three times at a speed of 1.5 meters per minute. The copper is deposited at room temperature with a current density of 2 A/dm$^2$ using two copper anodes. After passing through the bath three times, the wire is covered with a copper coat of 0.75 micrometer in thickness. The coated wire is then rinsed with distilled water. The wire is then subjected to annealing in a continuous annealing oven at 950° C. in an argon atmosphere (wire speed 10 m/min, dwell time approximately 3 s) and, after emerging from the oven and cooling, it is drawn to a diameter of 0.06 millimeter in 6 steps. The wire then passes through an etching solution consisting of 3000 ml distilled water
300 g ammonium peroxodisulfate and
300 ml hydrochloric acid, density 1.19 and immediately afterwards washed with distilled water and taken up on spool. The spool of wire is then again washed with distilled water in an ultrasonic bath for approximately 15 minutes. Subsequently, the wire is woven into a gauze in a known manner.

The surface area of the so obtained gauze is determined with the aid of cyclic voltammetry. The gauze manufactured in accordance with the process of the invention has now a surface which, as compared to a gauze of untreated wire, is enlarged by the factor 300. Pictures with a scanning electron microscope show the coral-like structure of the surface.

While there has been described what is at present considered to be preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. Process for the manufacture of a wire-woven gauze for a catalytic converter comprising the noble metal alloys platinum/rhodium or platinum/rhodium/palladium with an enlarged surface, comprising:

coating the wire with base metal or form a base metal coating consisting of at least one metal selected from the group consisting of copper and nickel;
diffusion annealing the coated wire forming a noble metal/base metal solid solution zone;
dissolving the base metal; and
weaving the so obtained wire.

2. Process in accordance with claim 1, in which the thickness of the base metal coating ranges between 0.3 micrometer and 1 millimeter.

3. Process in accordance with claim 1, which comprises carrying out the diffusion annealing at a temperature between 750° C and the melting point of the base metal.

4. Process in accordance with claim 1, which comprises continuing the diffusion annealing until 1–30% of the original wire diameter are converted into the noble metal/base metal solid solution zone, measured from the interface of noble metal alloy/base metal.

5. Process in accordance with claim 1, which comprises continuing the diffusion annealing until approximately 3% of the original wire diameter are converted into the noble metal/base metal solid solution zone, measured from the interface of noble metal alloy/base metal.

6. Process in accordance with claim 1, which comprises carrying out the diffusion annealing in a continuous annealing oven.

7. Process in accordance with claim 1, which comprises carrying out the diffusion annealing in an atmosphere of protective gas.

8. Process in accordance with claim 1, in which the diameter of the wire to be coated ranges between 0.05–0.1 millimeter.

9. Process in accordance with claim 1, in which the diameter of the wire to be coated ranges between 0.1–0.5 millimeter.

10. Process in accordance with claim 9, which comprises after the diffusion annealing, drawing the wire to reduce the diameter thereof.

11. Process in accordance with claim 1, which comprises electrodepositing the base metal coating.

12. Process in accordance with claim 1, which includes dissolving the base metal with an etching solution.

13. Gauze for a catalytic converter made by the process for the manufacture of a wire-woven gauze for a catalytic converter comprising the noble metal alloys platinum/rhodium or platinum/rhodium/palladium with an enlarged surface comprising: coating the wire with base metal to form a base metal coating consisting of at least one metal selected from the group consisting of copper and nickel; diffusion annealing the coated wire forming a noble metal/base metal solid solution zone; dissolving the base metal; and weaving the so obtained wire;

the gauze comprising an enlarged surface which is an integral part of the wire gauze.

* * * * *